United States Patent
Noguchi et al.

(10) Patent No.: US 12,406,581 B2
(45) Date of Patent: Sep. 2, 2025

(54) POSITION INFORMATION OUTPUT METHOD, POSITION INFORMATION OUTPUT SYSTEM, AND PROGRAM

(71) Applicant: HONDA MOTOR CO., LTD., Tokyo (JP)

(72) Inventors: Kohei Noguchi, Tokyo (JP); Hodaka Mukohara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 88 days.

(21) Appl. No.: 18/284,559

(22) PCT Filed: Mar. 31, 2021

(86) PCT No.: PCT/JP2021/013850
§ 371 (c)(1),
(2) Date: Sep. 28, 2023

(87) PCT Pub. No.: WO2022/208728
PCT Pub. Date: Oct. 6, 2022

(65) Prior Publication Data
US 2024/0177605 A1    May 30, 2024

(51) Int. Cl.
*G08G 1/13* (2006.01)
*G08G 1/01* (2006.01)

(52) U.S. Cl.
CPC ............... *G08G 1/13* (2013.01); *G08G 1/01* (2013.01)

(58) Field of Classification Search
CPC .......... G08G 1/13; G08G 1/01; G08G 1/0112; G08G 1/0133; G08G 1/0141; G08G 1/052;

(Continued)

(56) References Cited

U.S. PATENT DOCUMENTS

| | | | |
|---|---|---|---|
| 2014/0195100 A1* | 7/2014 | Lundsgaard | G07C 5/008 701/29.6 |
| 2020/0184815 A1 | 6/2020 | Wakita | |

FOREIGN PATENT DOCUMENTS

| | | |
|---|---|---|
| CN | 106664507 | 5/2017 |
| JP | 2015-103025 | 6/2015 |

(Continued)

OTHER PUBLICATIONS

International Search Report and Written Opinion for International Application No. PCT/JP2021/013850 mailed on Jun. 15, 2021, 8 pages.

(Continued)

*Primary Examiner* — Davetta W Goins
*Assistant Examiner* — Sharmin Akhter
(74) *Attorney, Agent, or Firm* — Amin, Turocy & Watson, LLP

(57) ABSTRACT

Provided is a position information output method of causing a computer to acquire position information, which is information indicating a position of the moving body, indicating a position which is measured by a position measurement device mounted on a moving body at a first timing via a network from the moving body including at least one of a vehicle and a terminal device owned by an occupant of the vehicle, and output information, which indicates that the moving body is present at a position indicated by the position information, from an output part after a second timing when a predetermined parameter indicating a change from a state at the first timing has satisfied a predetermined condition.

4 Claims, 11 Drawing Sheets

(58) Field of Classification Search
CPC ...... G08G 1/096716; G08G 1/096775; H04W 4/40; H04W 12/02; H04W 4/029
See application file for complete search history.

(56) References Cited

FOREIGN PATENT DOCUMENTS

| | | |
|---|---|---|
| JP | 2016-143232 | 8/2016 |
| JP | 2019-075747 | 5/2019 |
| WO | 2015/184055 | 12/2015 |
| WO | 2019/003399 | 1/2019 |

OTHER PUBLICATIONS

Extended European Search Report for European Patent Application No. 21934895.0 dated Apr. 5, 2024.
Ghinita, et al. "Protecting Against Velocity-Based, Proximity-Based, and External Event Attacks in Location-Centric Social Networks", ACM Transactions on Spatial Algorithms and Systems, vol. 2, No. 2, Jun. 21, 2016 (Jun. 21, 2016), pp. 1-36, XP058692223, ISSN: 2374-0353, DOI: 10.1145/2910580.
Gruteser et al. "Anonymous Usage of Location-Based Services Through Spatial and Temporal Cloaking", Proceedings of the 1st International Conference on Mobile Systems, Applications and Services, Mobisys '03, Jan. 1, 2003 (Jan. 1, 2003), pp. 31-42, XP055732558, New York, New York, USA, DOI: 10.1145/1066116.1189037.
India Office Action for India Patent Application No. 202317065242 mailed Feb. 28, 2025.

\* cited by examiner

FIG. 5

TEMPORARY DB (341)

| MEASUREMENT DATE AND TIME | MONTH DATE 10:15 | MONTH DATE 10:16 | MONTH DATE 10:17 | MONTH DATE 10:18 | ... |
|---|---|---|---|---|---|
| VEHICLE ID | 11111 | 11111 | 11111 | 11111 | ... |
| POSITION INFORMATION | ... | ... | ... | ... | ... |
| MOVEMENT DISTANCE | | ... | ... | ... | ... |
| MOVEMENT SPEED | | ... | ... | ... | ... |

POSITION INFORMATION DB (342)

| MEASUREMENT DATE AND TIME | ... | MONTH DATE 10:15 | MONTH DATE 10:16 | MONTH DATE 10:17 | ... |
|---|---|---|---|---|---|
| VEHICLE ID | ... | 11111 | 11111 | 11111 | ... |
| POSITION INFORMATION | ... | ... | ... | ... | ... |

POSITION INFORMATION OUTPUT METHOD, POSITION INFORMATION OUTPUT SYSTEM, AND PROGRAM

TECHNICAL FIELD

The present invention relates to a position information output method, a position information output system, and a program.

BACKGROUND ART

In recent years, a system of transmitting traffic jam information and transmitting advertisement using movement information of moving bodies has become known. However, when positions of moving bodies are continuously notified, individuals may be able to be identified. Therefore, a technology that notifies the position of a moving body without identifying an individual is attracting attention.

For example, as a general method for performing anonymization processing, there is a method of statistically processing a certain number or more of individuals as a group. However, if statistical processing is performed, since individual characteristics will be lost, it will be impossible to send advertisements that are aimed at individuals. In addition, information is lost for a small number of moving bodies that cannot be grouped together.

In addition, in a communication device provided in a vehicle, after sending the current position information first, it is known to send only the position variation information at intervals of a predetermined time to prevent the current position of the vehicle from being leaked to a third party due to unauthorized access or the like (see Patent Document 1).

CITATION LIST

Patent Document

[Patent Document 1]
PCT International Publication No. 2019/003399

SUMMARY OF INVENTION

Technical Problem

However, in the related art, during initial reference position transmission, anonymity could not be ensured in some cases because the current position of the vehicle was known.

In consideration of the above-mentioned circumstances, the present invention is directed to providing a position information output method, a position information output system, and a program that are capable of securing anonymity of current positions of moving bodies.

Solution to Problem (1) A position information output method causes a computer to: acquire position information, which is information indicating a position of the moving body, indicating a position which is measured by a position measurement device (113, 260) mounted on a moving body at a first timing via a network from the moving body including at least one of a vehicle (100) and a terminal device (200) owned by an occupant of the vehicle; and output information, which indicates that the moving body is present at a position indicated by the position information, from an output part (330) after a second timing when a predetermined parameter indicating a change from a state at the first timing has satisfied a predetermined condition.

(2) In the above-mentioned (1), in a case the predetermined parameter is a distance, the computer may determine that the predetermined condition is satisfied when a movement distance of the vehicle from a position of the vehicle at the first timing is equal to or greater than a predetermined value.

(3) In the above-mentioned (1) or (2), in a case the predetermined parameter is a time, the computer may determine that the predetermined condition is satisfied when an elapsed time from a time in which the vehicle was at the first timing is equal to or greater than a predetermined value.

(4) In any one of the above-mentioned (1) to (3), the computer may acquire a movement speed of the moving body on the basis of information detected by a detector mounted on the moving body or the position information, in a case the movement speed is smaller than a predetermined value, set the predetermined parameter as a distance and determine that the predetermined condition is satisfied when a movement distance from a position of the vehicle at the first timing is equal to or greater than a predetermined value, and in a case the movement speed is greater than the predetermined value, set the predetermined parameter as a time and determine that the predetermined condition is satisfied when an elapsed time from a time in which the vehicle was a the first timing is equal to or greater than a predetermined value.

(5) In the above-mentioned (4), the computer may acquire an average value in a predetermined section as the movement speed of the moving body.

(6) A position information output system (1) includes a moving body including at least one of a vehicle (100) and a terminal device (200) owned by an occupant of the vehicle, and an information management server (300) configured to communicate with the moving body via a network, wherein the moving body includes a communication part (111, 210) configured to transmit position information, which is information indicating a position of the moving body, indicating a position which is measured by a position measurement device (113, 260) mounted on the moving body at a first timing to the information management server via a network, and the information management server includes an output controller (353) configured to output information, which indicates that the moving body is present at a position indicated by the position information, from an output part (330) after a second timing which is when a predetermined parameter indicating a change from a state at the first timing has satisfied a predetermined condition.

(7) A program causes a computer to: acquire position information, which is information indicating a position of the moving body, indicating a position which is measured by a position measurement device (113, 260) mounted on a moving body at a first timing via a network from the moving body including at least one of a vehicle (100) and a terminal device (200) owned by an occupant of the vehicle: and output information, which indicates that the moving body is present at a position indicated by the position information, from an output part (330) after a second timing when a predetermined parameter indicating a change from a state at the first timing has satisfied a predetermined condition.

Advantageous Effects of Invention

According to the above-mentioned (1) to (7), it is possible to secure anonymity of current positions of moving bodies.

BRIEF DESCRIPTION OF DRAWINGS

FIG. 5 is a view showing an example of contents of a temporary DB 341 and a position information DB 342.

DESCRIPTION OF EMBODIMENTS

Hereinafter, embodiments of a position information output method, a position information output system, and a program of the present invention will be described with reference to the accompanying drawings.

First Embodiment

[Entire Configuration]

Figure 1:
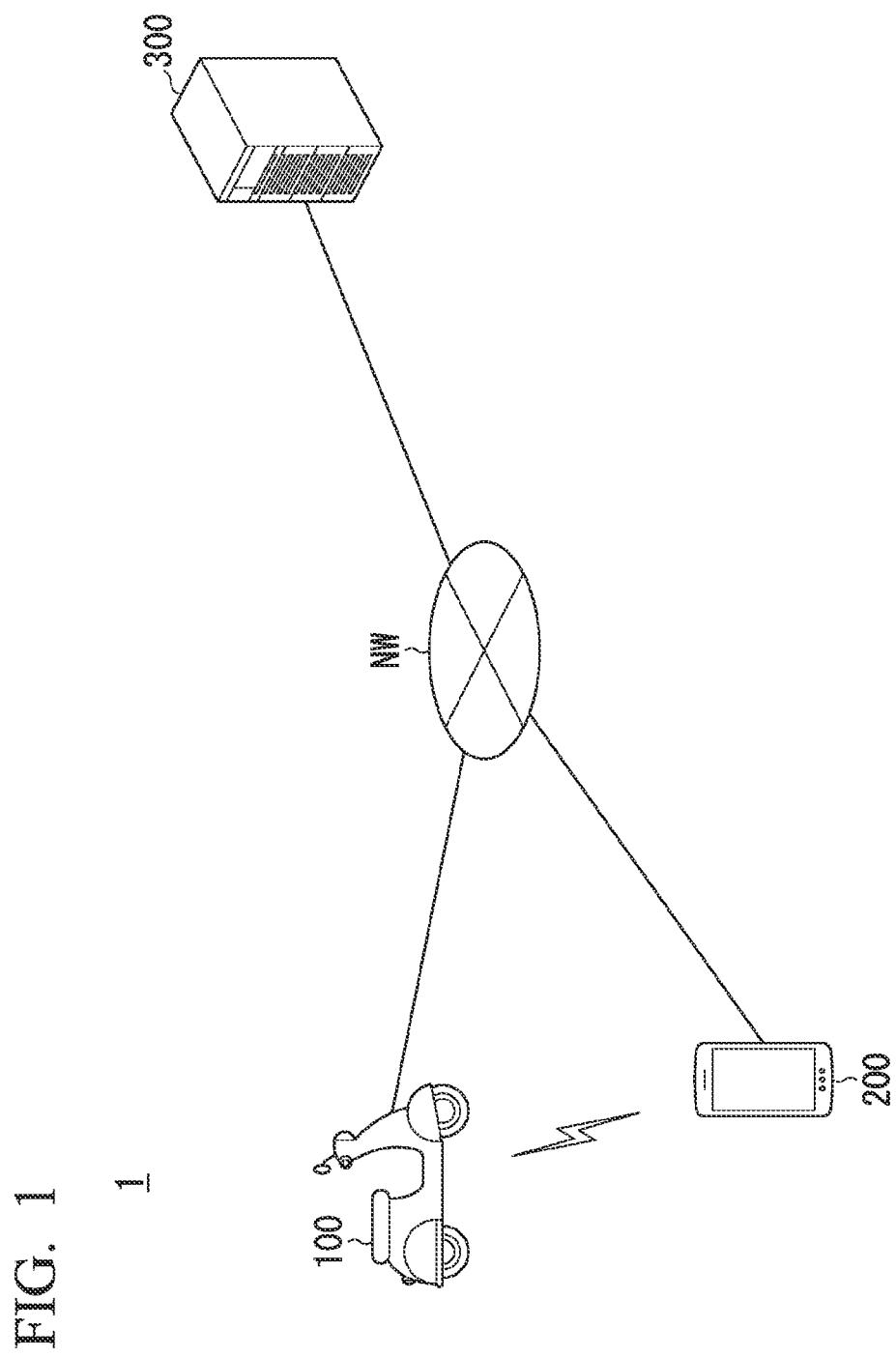
FIG. 1 is a schematic view of a position information output system 1 according to an embodiment.

FIG. 1 is a schematic view of a position information output system 1 according to an embodiment. The position information output system 1 is, for example, a motorcycle 100, a user terminal device 200, and an information management server 300. The motorcycle 100, the user terminal device 200, and the information management server 300 are connected to each other via a network NW. Further, the network NW includes, for example, the Internet, a wide area network (WAN), a provider device, a radio base station, and the like. Further, the motorcycle 100 and the user terminal device 200 can be connected to each other using near field communication.

The motorcycle 100 is, for example, a unit swing scooter type motorcycle. The user terminal device 200 is a communication terminal owned by an occupant in the motorcycle 100, and a portable terminal device having at least a communication function and a display function, for example, a mobile phone such as a smartphone or the like, a tablet terminal, a personal digital assistant (PDA), or the like. The motorcycle 100 and the user terminal device 200 are examples of moving bodies.

The information management server 300 manages information received from the motorcycle 100 or the user terminal device 200, and notifies a manager of the information received from the motorcycle 100 or the user terminal device 200. In the embodiment, while an example in which the information management server 300 notifies the manager of the information acquired by the motorcycle 100 will be described, the present invention is not limited thereto. For example, the information management server 300 may notify the manager of the information acquired by the user terminal device 200, transmit the information acquired by the motorcycle 100 through short-distance wireless communication, and notify the manager of the information received from the motorcycle 100 by the user terminal device 200.

<Motorcycle>

Figure 2:
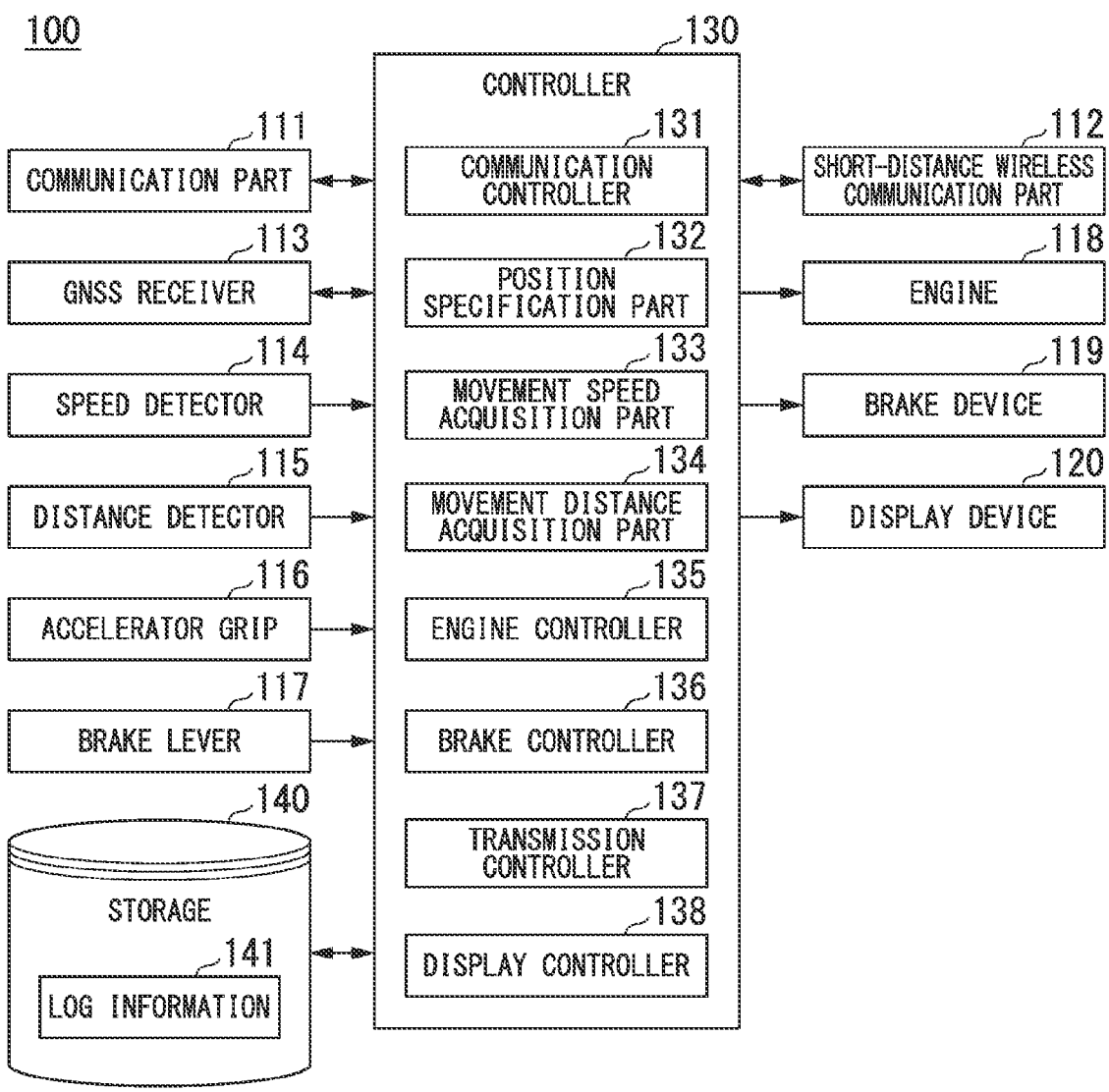
FIG. 2 is a functional block diagram of a motorcycle 100.

FIG. 2 is a functional block diagram of the motorcycle 100. The motorcycle 100 includes, for example, a communication part 111, a short-distance wireless communication part 112, a GNSS receiver 113, a speed detector 114, a distance detector 115, an accelerator grip 116, a brake lever 117, an engine 118, a brake device 119, a display device 120, a controller 130, and a storage 140.

The communication part 111 includes, for example, a communication interface such as an NIC or the like. The communication part 111 performs communication with the information management server 300 via a communication network such as the Internet or the like under control of the controller 130. The short-distance wireless communication part 112 has the user terminal device 200, an antenna and transmission/reception device that is a wireless module used for Bluetooth (registered trademark) or the like, and the like.

The GNSS receiver 113 receives a signal from a global navigation satellite system (GNSS) satellite. The speed detector 114 includes, for example, a wheel speed sensor attached to a wheel, and a speed calculator, and integrates wheel speeds detected by the wheel speed sensor to derive a traveling speed (vehicle speed) of the motorcycle 100 and outputs the derived traveling speed to the controller 130. The distance detector 115 includes a wheel rotation sensor attached to a wheel, and a traveling distance calculator, and derives a traveling distance of the motorcycle 100 on the basis of the wheel rotational speed detected by the wheel rotation sensor and outputs the derived traveling distance to the controller 130.

The accelerator grip 116 is equipped with a sensor that detects an operation quantity or presence of an operation, and receives instructions for acceleration. The brake lever 117 is equipped with a sensor that detects an operation quantity or presence of an operation, and receives instruction for deceleration or stopping.

The engine 118 outputs a traveling driving force (torque) for the motorcycle 100 to travel to the driving wheels. The engine 118 includes, for example, an internal combustion engine, an electric motor, a gearbox, and the like. The brake device 119 includes, for example, a brake caliper, a cylinder configured to transmit a hydraulic pressure to the brake caliper, and an electric motor configured to generate a hydraulic pressure in the cylinder. The display device 120 includes, for example, a liquid crystal display (LCD), an organic electroluminescence (EL) display, or the like. The display device 120 is installed at a position that is easily seen by a driver during driving.

The controller 130 is, for example, an electronic control unit (ECU). The controller 130 is described as one block for the sake of simplicity of description, but it is not limited to this and may be divided into plurality of units.

The controller 130 includes, for example, a communication controller 131, a position specification part 132, a movement speed acquisition part 133, a movement distance acquisition part 134, an engine controller 135, a brake controller 136, a transmission controller 137, and a display controller 138. Some or all of these functional units are realized by executing a program (software) stored in a storage thereof using a processor such as a central processing unit (CPU) or the like. In addition, some or all of the functions of these components may be realized by hardware (circuit unit: including circuitry) such as a large scale integration (LSI), an application specific integrated circuit (ASIC), a field-programmable gate array (FPGA), or the like, or may be realized by cooperation of software and hardware. The program may be stored in a storage device such as a hard disk drive (HDD), a flash memory, or the like, in advance, may be stored in a detachable storage medium such as a DVD, a CD-ROM, or the like, or may be installed by mounting a storage medium in a drive device.

The communication controller 131 controls the communication part 111 and performs communication with the information management server 300 via the network NW. In addition, the communication controller 131 controls the short-distance wireless communication part 112 and performs communication with the user terminal device 200.

The position specification part 132 specifies a position of the motorcycle 100 on the basis of the signal received by the GNSS receiver 113. The position of the motorcycle 100 is expressed as a latitude and longitude. Further, the position specification part 132 generates information (hereinafter, referred to as position information) in which information indicating the specified position of the motorcycle 100 is associated with information indicating measurement date and time (date and time specifying the position of the motorcycle 100).

The movement speed acquisition part 133 acquires information (hereinafter, referred to as movement speed information) showing a movement speed of the motorcycle 100 on the basis of the output from the speed detector 114. The "movement speed" may be a speed per hour at a certain time, or may be an average value of a speed per hour in a predetermined section. The predetermined section may be a predetermined period defined by time, or a predetermined length defined by a distance. By doing this, even if there is a temporary deceleration from high speed traveling, it can be prevented from notifying the location immediately. Further, not limited to this, the movement speed acquisition part 133 may acquire movement speed information based on the information indicating the speed acquired by the GNSS receiver 113.

The movement distance acquisition part 134 acquires information (hereinafter, referred to as movement distance information) showing a movement distance of the motorcycle 100 from the distance detector 115. The "movement distance" may be a total value of a traveling distance from a time when the motorcycle 100 turns on an ignition switch (for example, a time when the engine 118 is started with the accelerator grip 116), or may be a traveling distance from a timing when the previous movement distance was acquired.

The engine controller 135 controls the engine 118 on the basis of operation contents received via the accelerator grip 116. The brake controller 136 controls the brake device 119 on the basis of the operation contents received via the brake lever 117.

The transmission controller 137 continuously transmits position information of the motorcycle 100 generated by the position specification part 132 to the information management server 300 using the communication part 111 when the ignition switch of the motorcycle 100 is turned on. Here, the transmission controller 137 may transmit the movement speed information acquired by the movement speed acquisition part 133 or the movement distance information acquired by the movement distance acquisition part 134 to the information management server 300 together with the position information. When the ignition switch is turned off, the transmission controller 137 stops transmission of the position information or the like. Hereinafter, the information transmitted by the transmission controller 137 may be referred to as vehicle information.

The display controller 138 displays predetermined illustration or character information on the display device 120. For example, the display controller 138 receives the information generated on the basis of the transmitted position information (for example, a traffic jam map showing traffic conditions, a request of requesting delivery to a delivery destination near a host vehicle, or the like) from the information management server 300 and displays the received information on the display device 120.

The storage 140 is realized by, for example, a random access memory (RAM), a read only memory (ROM), a hard disk drive (HDD), or the like. The storage 140 stores programs executed by the processor, and also stores log information 141 and the like. The log information 141 stores position information in which the information indicating measurement date and time is associated with the position acquired by the position specification part 132. For example, the position specification part 132 periodically acquires position information at predetermined times (for example, several seconds, several microseconds) and stores the position information in the log information 141. In the log information 141, the position information may be automatically deleted when a predetermined time has elapsed.

<User Terminal Device>

Figure 3:
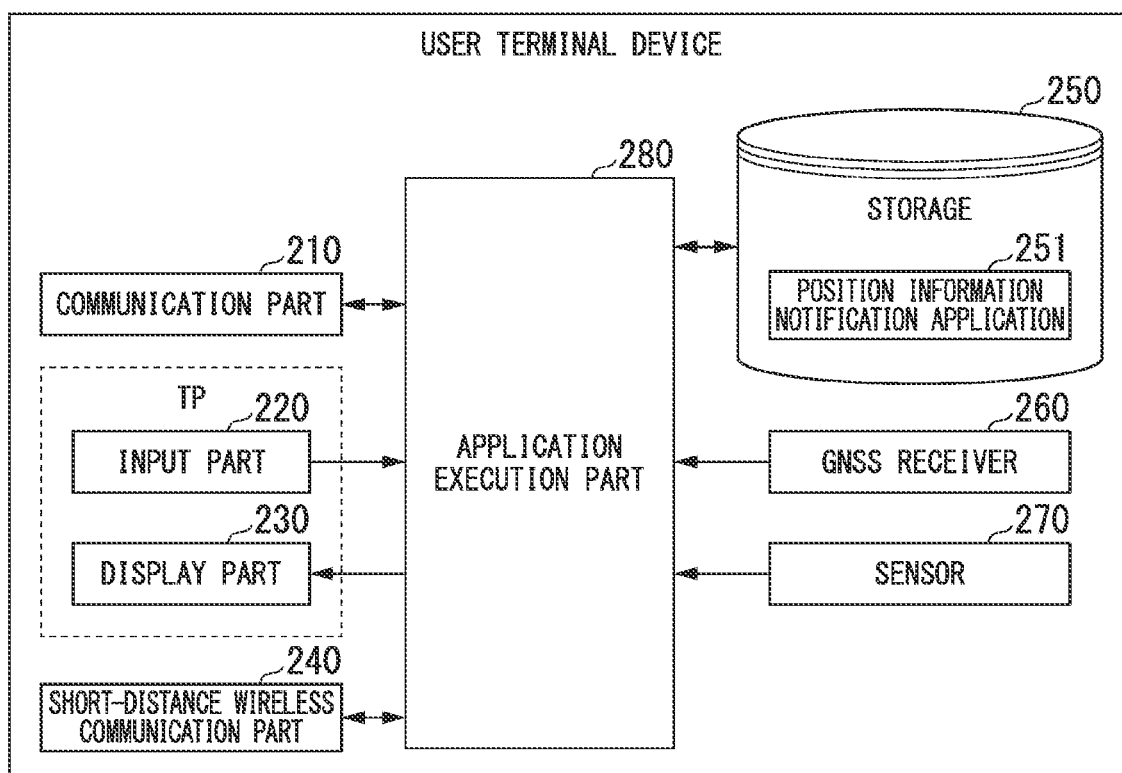
FIG. 3 is a functional block diagram of a user terminal device 200.

FIG. 3 is a functional block diagram of the user terminal device 200. The user terminal device 200 includes, for example, a communication part 210, an input part 220, a display part 230, a short-distance wireless communication part 240, a storage 250, a GNSS receiver 260, a sensor 270, and an application execution part 280.

The communication part 210 includes, for example, a communication interface such as an NIC or the like. The communication part 210 performs communication with the information management server 300 via a communication network such as the Internet or the like under control by the application execution part 280.

The input part 220 includes, for example, some or all of a touch panel TP formed integrally with the display part 230, various keys, buttons, a dial switch, a mouse, and the like. The display part 230 is, for example, a liquid crystal display (LCD), an organic electro luminescence (EL) display device, or the like. The short-distance wireless communication part 240 has, for example, an antenna and transmission/reception device, or the like, which is a wireless module used for Bluetooth (registered trademark) or the like.

The storage 250 is realized by, for example, a random access memory (RAM), a read only memory (ROM), a flash memory, an SD card, a register, or the like. A position information report application 251 is stored in the storage 250. The position information report application 251 is a program that displays an interface configured to use the user terminal device 200 as a moving body notifying the position of the motorcycle 100 on the display part 230, and executes processing in the user terminal device 200 based on the information input via an interface.

The GNSS receiver 260 receives a signal from a GNSS satellite. The sensor 270 includes an acceleration sensor or the like, and detects information for measuring a movement speed, a movement distance, or the like of the user terminal device 200 and outputs the detected information to the application execution part 280.

The application execution part 280 is realized by executing the position information report application (program) 251 stored in the storage 250 using a processor such as a CPU or the like. The position information report application 251 may be downloaded from another device via, for example, the network NW, or may be previously installed in the user terminal device 200.

The application execution part 280 has the same functions as the communication controller 131, the position specification part 132, the movement speed acquisition part 133, the movement distance acquisition part 134, and the transmission controller 137 of the motorcycle 100. For example, the application execution part 280 generates position information indicating the position of the user terminal device 200 specified by the position specification part 132 from the time when the application was turned on, and starts continuous transmission of the position information to the information management server 300 using the communication part 210. Here, the application execution part 280 may acquire movement speed information indicating a movement speed of the user terminal device 200 or movement distance information indicating a movement distance of the user terminal device 200, and transmit the acquired information to the information management server 300 together with the position information. When the application is turned off, the application execution part 280 stops transmission of the position information or the like.

In addition, when the position information, movement speed information, movement distance information, and the like, are received from the motorcycle 100 through near field communication, the application execution part 280 may continuously transmit these pieces of received information to the information management server 300 via the network NW.

<Information Management Server>

Figure 4:
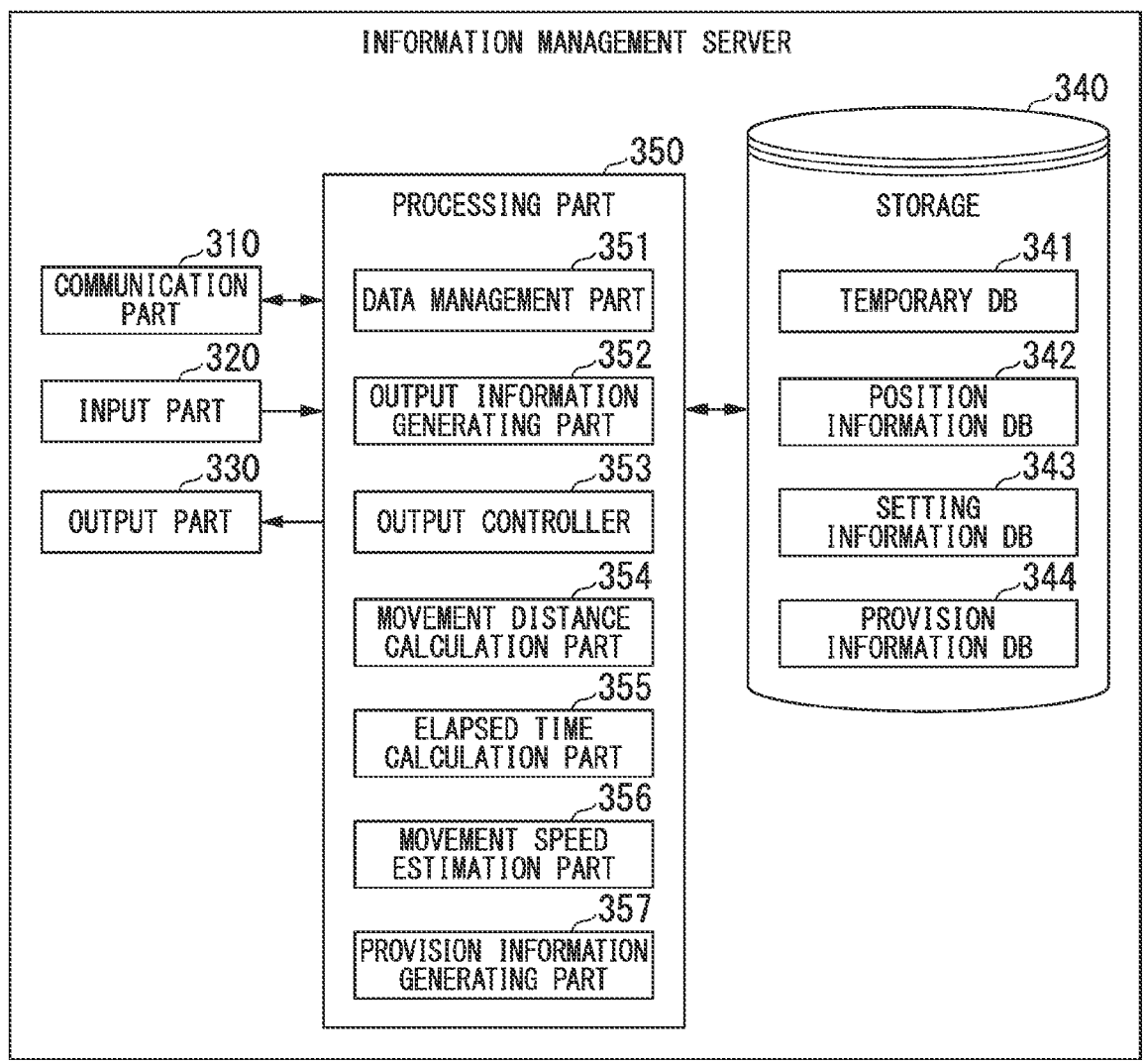
FIG. 4 is a functional block diagram of an information management server 300.

FIG. 4 is a functional block diagram of the information management server 300. The information management server 300 includes, for example, a communication part 310, an input part 320, an output part 330, a storage 340, and a processing part 350.

The communication part 310 includes, for example, a communication interface such as an NIC or the like. The communication part 310 performs communication with the motorcycle 100 or the user terminal device 200 via a communication network such as the Internet or the like under control by the processing part 350.

The input part 320 includes, for example, some or all of various keys, buttons, a dial switch, a mouse, and the like. The output part 330 includes, for example, an LCD, an organic EL display device, a speaker, a projector, or the like. The storage 340 is realized by, for example, a RAM, a ROM, an HDD, or the like. The storage 340 stores a program executed by the processor, as well as a temporary DB 341, a position information DB 342, a setting information DB 343, a provision information DB 344, and the like. Details of each piece of information will be described below.

The processing part 350 includes, for example, a data management part 351, an output information generating part 352, an output controller 353, a movement distance calculation part 354, an elapsed time calculation part 355, a movement speed estimation part 356, and a provision information generating part 357. For example, some or all of these functional units are realized by executing a program (software) stored in a storage thereof using a processor such as a CPU or the like. In addition, some or all of functions of these components may be realized by hardware (circuit unit: including circuitry) such as an LSI, an ASIC, an FPGA, or the like, or may be realized by cooperation of software and hardware. The program may be previously stored in a storage device such as an HDD, a flash memory, or the like, stored in a detachable storage medium such as a DVD, a CD-ROM, or the like, or installed by mounting a storage medium in a drive device.

The data management part 351 stores the information received from the motorcycle 100 or the user terminal device 200 via the communication part 310 in the storage 340 as a part of the temporary DB 341. The temporary DB 341 is a database in which information received from the motorcycle 100 or the user terminal device 200 is saved.

FIG. 5 is a view showing an example of contents of the temporary DB 341 and the position information DB 342. The temporary DB 341 is, for example, information in which a vehicle ID, position information, a movement distance, and movement speed are associated with measurement date and time. The measurement date and time are information indicating date and time when the position of the motorcycle 100 is measured. The vehicle ID is information for identifying each of the motorcycles 100. The movement distance and the movement speed are information acquired by the motorcycle 100, and stored in the temporary DB 341 when transmitted from the motorcycle 100.

The output information generating part 352 generates information (hereinafter, referred to as output information) to be output to the output part 330 on the basis of the temporary DB 341. For example, the output information generating part 352 generates output information for outputting the position information measured at a first timing to the output part 330 at a second timing slower than the first timing.

The second timing is a timing when a predetermined parameter indicating a change from the state at the first timing has satisfied a predetermined condition. For example, a distance, a time, a speed, and the like, are included in the predetermined parameter. The second timing includes, for example, a timing when a movement distance (hereinafter, referred to as a movement distance M) from a position where the motorcycle 100 is at the first timing is a threshold Th_m or more, a timing when an elapsed time (hereinafter, referred to as an elapsed time T) from a time where the motorcycle 100 was at the first timing becomes a threshold Th_t or more, and the like, and details thereof will be described below.

The movement distance M may be, for example, information indicating a movement distance received from the motorcycle 100 as the vehicle information, or information indicating a movement distance calculated by the movement distance calculation part 354, which will be described below. The elapsed time T is, for example, information indicating an elapsed time calculated by the elapsed time calculation part 355, which will be described below.

In the embodiment, the output information generating part 352 saves a copy of information satisfying a condition at the second timing, among the information stored in the temporary DB 341, in position information DB. That is, the position information DB is an example of the output information.

As shown in FIG. 5, the position information DB 342 is, for example, information in which the vehicle ID and the position information are associated with the measurement date and time.

The output controller 353 outputs information indicating a position of the motorcycle 100 measured at the first timing from the output part 330 after the second timing on the basis of the output information generated by the output information generating part 352. For example, the output controller 353 outputs a map image, in which the latest position of the motorcycle 100 is displayed on a map, from the output part 330 on the basis of the position information DB 342. Further, when the next latest position of the motorcycle 100 is added to the position information DB 342, the output controller 353 updates the map image on the basis of the information indicating the next latest position of the motorcycle 100.

By doing this, the position measured at the first timing can be continuously output to the output part 330 after the second timing. Accordingly, since the current position of the motorcycle 100 cannot be output to the output part 330, anonymity can be continuously secured. In addition, by setting the timing that notifies the position of the motorcycle 100 to the second timing that can be set in the condition using the threshold described above, it is possible to notify the approximate current position.

The movement distance calculation part 354 calculates a distance from a position P1 of the motorcycle 100 to a position P2 of the motorcycle 100 as the movement distance M with reference to the temporary DB 341. The position P1 of the motorcycle 100 is the position shown by position information of an object to be determined whether or not the second timing has been reached, for example, the position information determined immediately before the second timing. The date and time when the position P1 of the motorcycle 100 is measured are a first timing.

The elapsed time calculation part 355 calculates a time from date and time D1 when the position P1 of the motorcycle 100 is measured to date and time D2 when the position P2 of the motorcycle 100 is measured as the elapsed time T with reference to the temporary DB 341.

The movement speed estimation part 356 estimates a movement speed S of the motorcycle 100 by dividing the movement distance M, which is calculated by the movement distance calculation part 354, by the elapsed time T which is calculated by the elapsed time calculation part 355. Not limited to this, the movement speed estimation part 356 may estimate the movement speed S based on the information indicating the speed of the moving body acquired by the GNSS receiver.

The provision information generating part 357 generates provision information to be provided to the motorcycle 100 or the user terminal device 200 on the basis of the position information DB 342, stores the provision information in the provision information DB 344 and transmits the provision information read from the provision information DB 344 to the motorcycle 100 or the user terminal device 200 by using the communication part 310. In this way, by setting the information referenced when the provision information is generated as the position information DB 342, even when the provision information is generated, anonymity of the motorcycle 100 or the user terminal device 200 can be secured.

Figure 6:
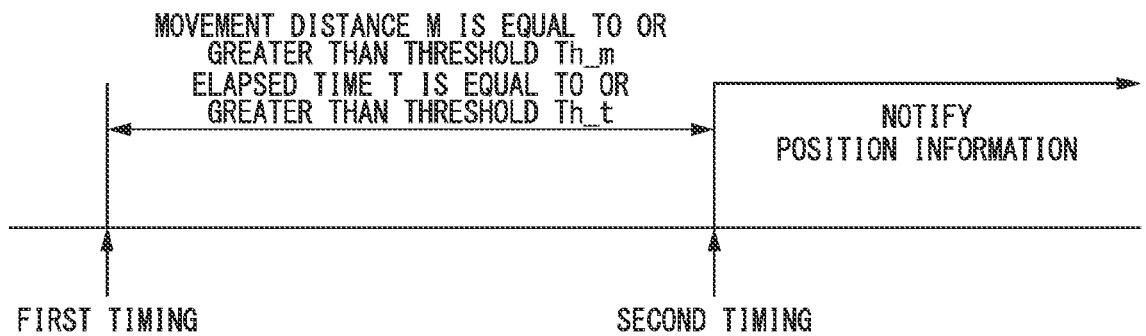
FIG. 6 is a view for describing an example of a second timing determination method (Part 1).

Next, an example of the first timing and the second timing will be described. FIG. 6 is a view for describing an example of a second timing determination method (Part 1). The second timing determination method (Part 1) is an example of determination at the second timing when any one of a condition 1 of a distance and a condition 2 of time is satisfied.

In the condition 1, the movement distance M from the position where the motorcycle 100 is at the first timing is the threshold Th_m or more, and the threshold Th_m is, for example, several hundred meters. In the condition 2, the elapsed time T from the time of the first timing is the threshold Th_t or more, and the threshold Th_t is, for example, several minutes. By doing this, the information management server 300 can output the information indicating the position of the motorcycle 100 measured at the first timing to the output part 330 at, not immediately after the first timing, but at the second timing when the condition 1 or the condition 2 is satisfied.

Figure 7:
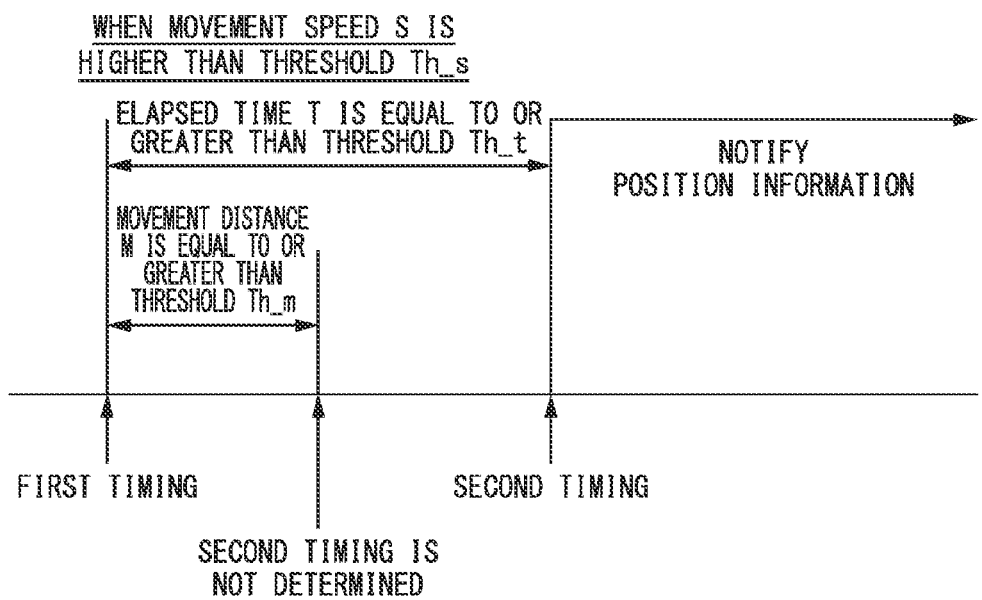
FIG. 7 is a view for describing an example of a second timing determination method (Part 2).

FIG. 7 is a view for describing an example of a second timing determination method (Part 2). The second timing determination method (Part 2) is an example of determination at the second timing when the condition 1 of the distance is satisfied and a condition 3 of the speed is not satisfied and determination at the second timing when all the condition 1 of the distance, the condition 2 of the time and the condition 3 of the speed are satisfied.

In the condition 3, the movement speed S of the motorcycle 100 at the first timing is higher than the threshold Th_s, and the threshold Th_s is, for example, an average speed per hour of about 30 km. By doing this, even though the movement distance M is equal to or greater than the threshold Th_m when the motorcycle 100 is traveling on an expressway or the like, if enough time has not passed after the first timing, it is not determined as the second timing, and it can be determined as the second timing after enough time has passed.

Here, while the movement speed S is a speed of a motorcycle at a first timing detected by a sensor of the motorcycle, there is no limitation thereto. For example, the speed may be an average speed between the position P1 of the motorcycle 100 at the first timing and a position P0 of the motorcycle 100 at the previous measurement timing. Further, the information indicating the condition 1 to the condition 3 is stored in the setting information DB 343.

<Sequence Diagram>

Figure 8:
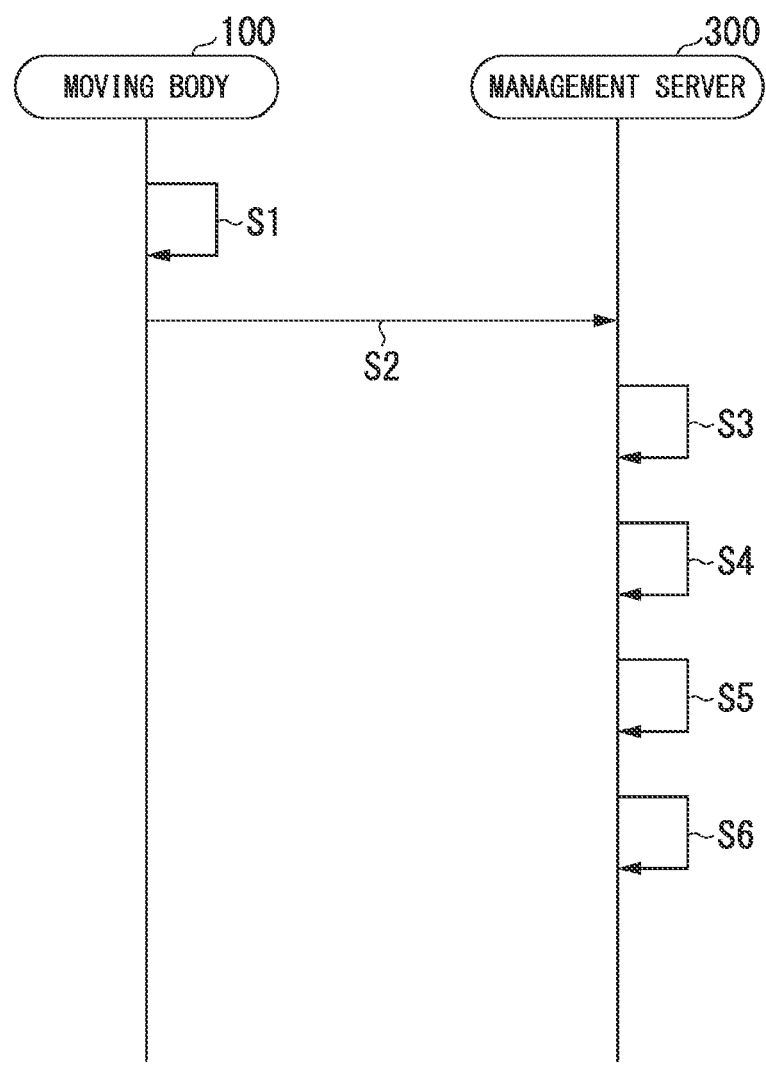
FIG. 8 is a sequence diagram showing an example of processing in the position information output system 1.

FIG. 8 is a sequence diagram showing an example of processing in the position information output system 1. As described above, an example of notifying a manager of information acquired by the motorcycle 100 will be described. First, the motorcycle 100 generates vehicle information including information indicating a position at the first timing (step S1), and transmits the vehicle information to the information management server 300 via the network NW (step S2). As described above, the vehicle information includes position information, movement speed information, movement distance information, and the like.

Then, the information management server 300 stores the received vehicle information in the temporary DB 341 (step S3). Next, the information management server 300 determines whether the latest vehicle information saved in the temporary DB 341 satisfies a predetermined condition (step S4), and copies position information and saves the position information in the position information DB 342 when the predetermined condition is satisfied (step S5). Then, the information management server 300 outputs the information indicating the position of the motorcycle 100 from the output part 330 with reference to the position information DB 342 (step S6).

<Flowchart>

Figure 9:
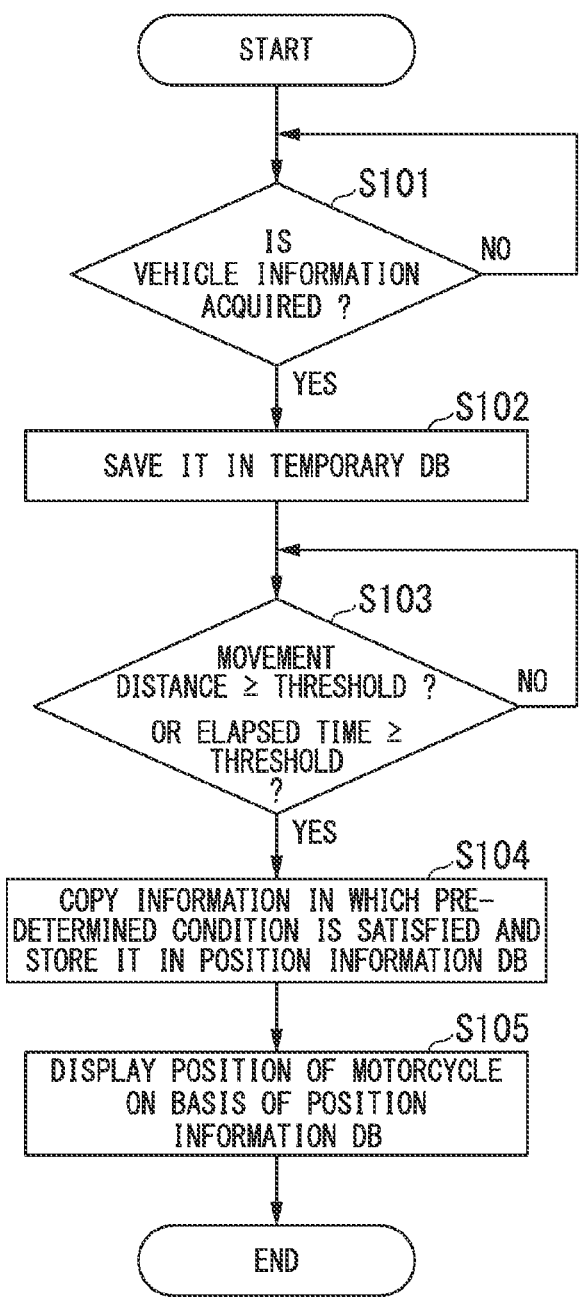
FIG. 9 is a flowchart showing an example of processing of the information management server 300 by the second timing determination method (Part 1).

FIG. 9 is a flowchart showing an example of processing of the information management server 300 by the second timing determination method (Part 1). The data management part 351 determines whether the vehicle information is received from the motorcycle 100 (step S101), and saves the received vehicle information in the temporary DB 341 when the vehicle information is received (step S102). Then, the output information generating part 352 determines whether the condition 1 (the movement distance M is the threshold Th_m or more) or the condition 2 (the elapsed time T is the threshold Th_t or more) is satisfied (step S103). When the condition 1 or the condition 2 is satisfied, the output information generating part 352 copies the position information in which either the condition 1 or the condition 2 is satisfied, and saves the position information in the position information DB 342 (step S104). Next, the output controller 353 outputs the information indicating the position of the motorcycle 100 from the output part 330 with reference to the position information DB 342 (step S105).

In this way, by notifying the position of the motorcycle 100 when the predetermined time or the predetermined distance has passed, real time position information can be concealed and the privacy of the motorcycle 100 and the occupant therein can be protected. In addition, since the notified position information is the information specified by the GNSS receiver 113 of the motorcycle 100, it is possible to notify an accurate position that the motorcycle 100 has existed little bit before. Further, if it is not possible to notify the accurate position, in urban areas with complicated roads, etc., false information such as traveling on a different road on the map may be notified. According to the embodiment, it is possible to avoid such a situation.

Figure 10:
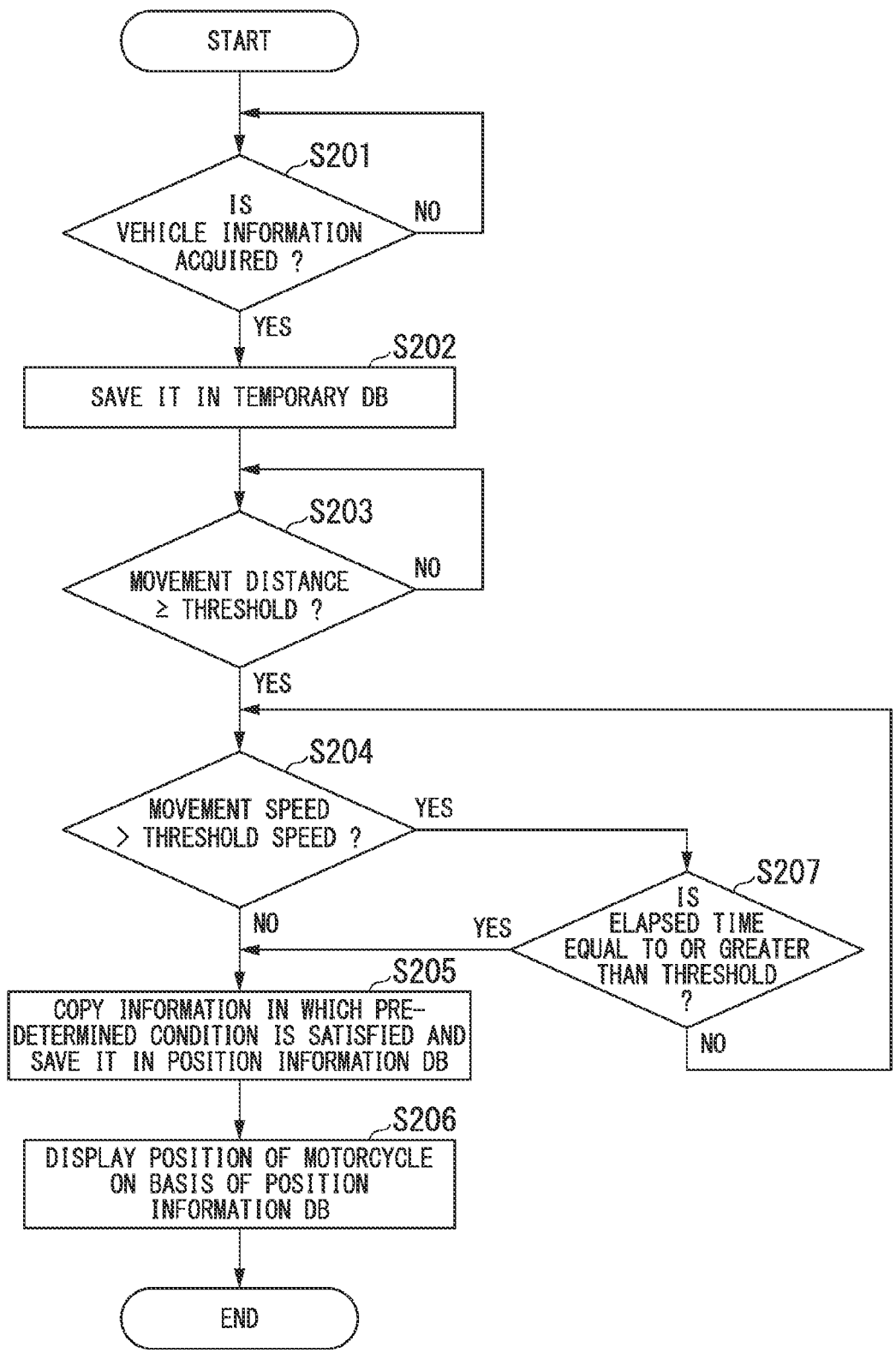
FIG. 10 is a flowchart showing an example of processing of the information management server 300 by the second timing determination method (Part 2).

FIG. 10 is a flowchart showing an example of processing of the information management server 300 by the second timing determination method (Part 1). The data management part 351 determines whether the vehicle information is received from the motorcycle 100 (step S201), and saves the received vehicle information in the temporary DB 341 when the vehicle information is received (step S202). Then, the output information generating part 352 determines whether the condition 1 (the movement distance M of the motorcycle 100 is the threshold Th_m or more) is satisfied (step S203). When the condition 1 is satisfied, the output information generating part 352 determines whether the condition 3 (the movement speed S of the motorcycle 100 is higher than the threshold Th_s) is satisfied (step S204).

When the condition 3 is not satisfied, the output information generating part 352 copies the position information that the condition 1 is satisfied and the condition 3 is not satisfied, and saves the position information in the position information DB 342 (step S205). Then, the output controller 353 outputs the information indicating the position of the motorcycle 100 from the output part 330 with reference to the position information DB 342 (step S206).

Meanwhile, when the condition 3 is satisfied in step S204, the output information generating part 352 determines whether the condition 2 (the elapsed time T is the threshold Th_t or more) is satisfied (step S207). When the condition 2 is not satisfied, the output information generating part 352 returns to step S204 and repeats the processing. Meanwhile, in step S207, when the condition 2 is satisfied, the processing is shifted to processing 205. Further, the condition 2 in step S207 may have a shorter duration of the threshold Th_t than the condition 2 in step S103.

Further, during high speed traveling, if the second timing is the timing when the movement distance is the threshold Th_m or more, the current position may be notified almost at real time. Here, as described above, at the high speed, by setting the timing when the elapsed time T from the time of the first timing is equal to or greater than the threshold Th_t as the second timing, the anonymity of the motorcycle 100 and the occupant therein can be maintained.

Further, the processing of the information management server 300 by the second timing determination method (Part 2) is not limited thereto. For example, the output information generating part 352 may determine whether the condition 1 (the movement distance M of the motorcycle 100 is the threshold Th_m or more) is satisfied when the condition 3 (the movement speed S of the motorcycle 100 is higher than the threshold Th_s) is not satisfied, and may execute the processing of step S205 when the condition 1 is satisfied. In addition, the output information generating part 352 may determine whether the condition 2 (the elapsed time T is the threshold Th_t or more) is satisfied when the condition 3 (the movement speed S of the motorcycle 100 is higher than the threshold Th_s) is satisfied, and may execute the processing of step S205 when the condition 2 is satisfied.

According to the above-mentioned first embodiment, a computer acquires position information, which is information showing a position of the moving body, indicating a position which is measured by a position measurement device (113, 260) mounted on a moving body at a first timing via a network from the moving body including at least one of a vehicle (100) and a terminal device (200) owned by an occupant of the vehicle, and outputs information, which shows that the moving body is present at a position indicated by the position information, from an output part (330) after a second timing when a predetermined parameter indicating a change from a state at the first timing has satisfied a predetermined condition, thereby securing anonymity of a current position of the moving body.

In addition, since the second timing is set as a timing when the movement distance M from the position of the motorcycle 100 at the first timing becomes equal to or greater than the threshold Th_m, or a timing when the elapsed time T from the time of the first timing of the motorcycle 100 becomes equal to or greater than the threshold Th_t, it is possible to set a predetermined distance not too close or too far from the current position, and it is possible to notify the approximate current position while protecting the privacy of the motorcycle 100 and the occupant therein.

Second Embodiment

Hereinafter, a second embodiment will be described. In the first embodiment, the example in which the second timing determination processing is executed by the information management server 300 has been described. In the second embodiment, an example in which the second timing determination processing is executed by a motorcycle 100A will be described. Hereinafter, description will be performed while focusing on the differences from the first embodiment.

Figure 11:
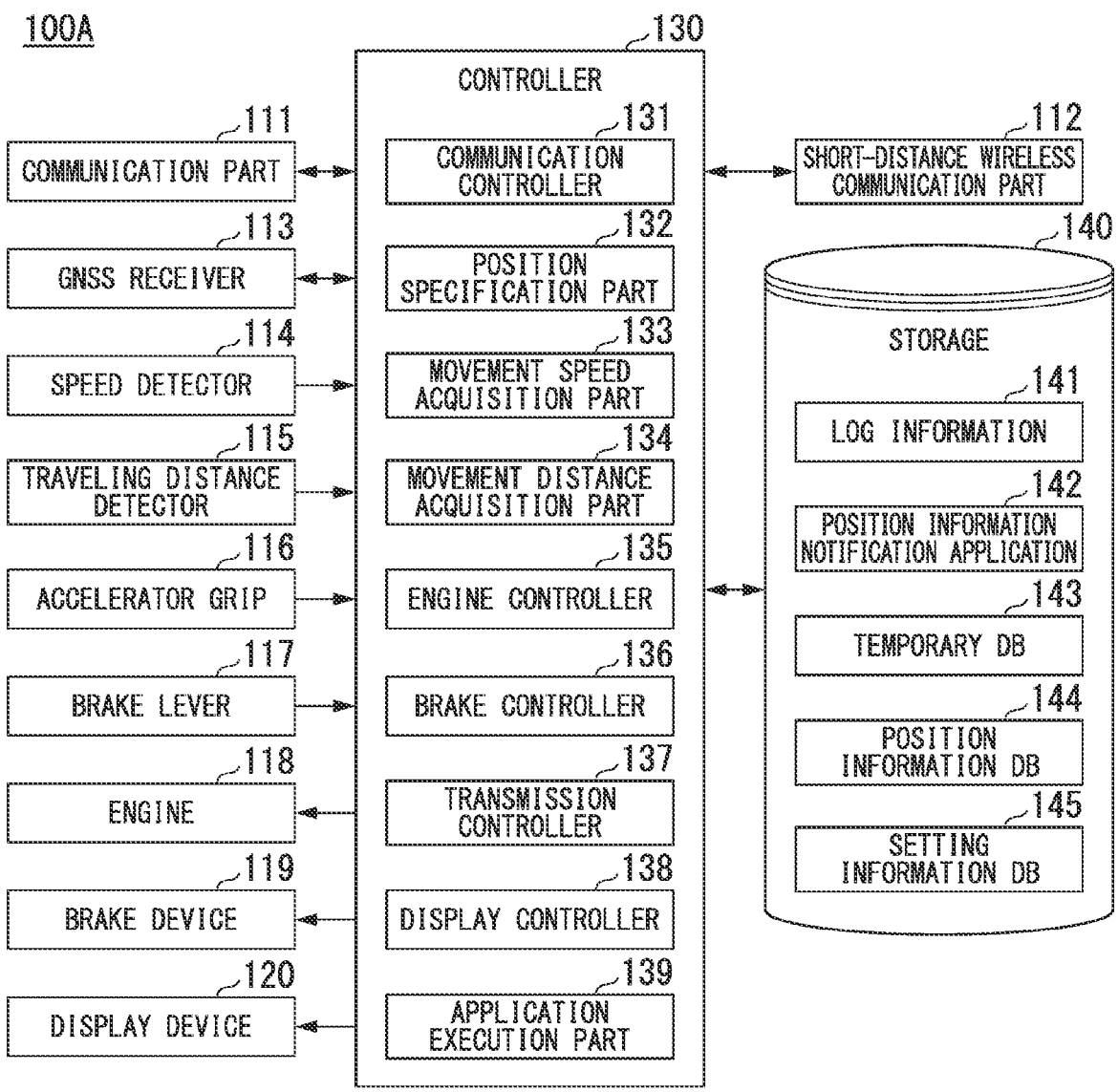
FIG. 11 is a functional block diagram of a motorcycle 100A.

FIG. 11 is a functional block diagram of a motorcycle 100A of the second embodiment. Here, differences from the motorcycle 100 of the first embodiment will be described. The motorcycle 100A further stores a position information report application 142, a temporary DB 143, a position information DB 144, and a setting information DB 145 in the storage 140. These DBs are the same as the temporary DB 341, the position information DB 342, and the setting information DB 343 of the information management server 300. Further, the position information report application 142 is a program that causes the motorcycle 100 to execute second timing determination processing by the information management server 300.

The controller 130 further includes an application execution part 139. The application execution part 139 is, for example, realized by executing a position information report application (program) 142 stored in the storage 140 using a processor such as a CPU or the like. For example, the application execution part 139 executes the second timing determination processing and transmits the position information that the condition of the second timing is satisfied to the information management server 300. The information management server 300 saves the received position information in the position information DB 342, and outputs the received position information from the output part 330 immediately.

Third Embodiment

Hereinafter, a third embodiment will be described. In the first embodiment, the example in which the second timing determination processing is executed by the information management server 300 has been described. In the third embodiment, an example in which the second timing determination processing is executed by a user terminal device 200A will be described. Hereinafter, description will be performed while focusing on differences from the first embodiment.

Figure 12:
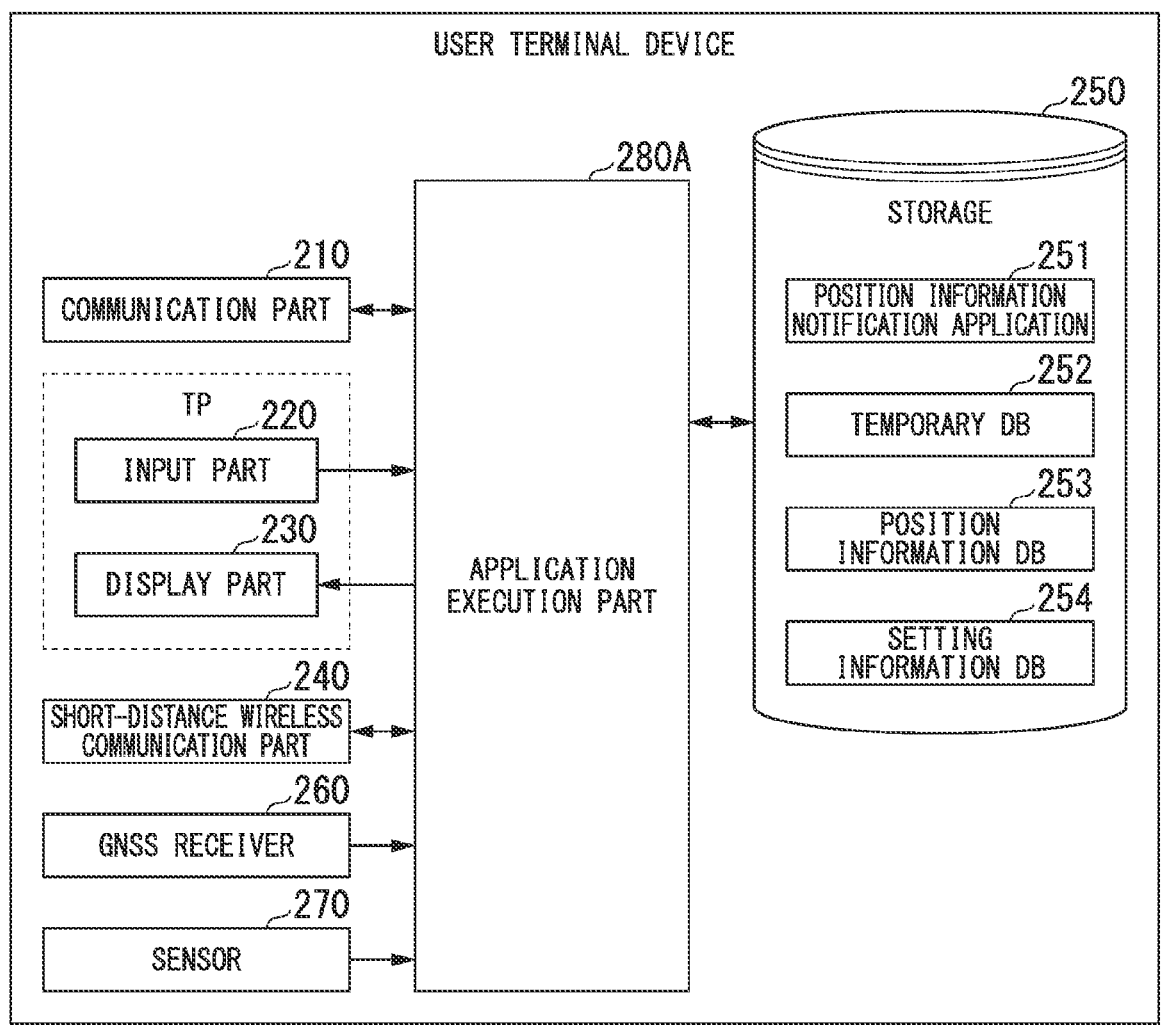
FIG. 12 is a functional block diagram of a user terminal device 200A.

FIG. 12 is a functional block diagram of the user terminal device 200A of the third embodiment. Here, differences from the user terminal device 200 of the first embodiment will be described. The user terminal device 200A further stores a temporary DB 252, a position information DB 253, and a setting information DB 254 in the storage 250. These DBs are the same as the temporary DB 341, the position information DB 342, and the setting information DB 343 of the information management server 300.

The application execution part 280 includes the same function as the processing part 350 of the information management server 300. For example, the application execution part 280 executes the second timing determination processing, and transmits the position information in which the condition of the second timing is satisfied to the information management server 300. The information management server 300 saves the received position information in the position information DB 342, and outputs the received position information from the output part 330 immediately.

The above-mentioned embodiment can be expressed as follows.

A position information output method comprising:
a storage device; and
a hardware processor configured to execute a program stored in the storage device,
wherein the hardware processor executes the program to:
acquire position information, which is information indicating a position of the moving body, indicating a position which is measured by a position measurement device mounted on a moving body at a first timing via a network from the moving body including at least one of a vehicle and a terminal device owned by an occupant of the vehicle: and
outputs information, which indicates that the moving body is present at a position indicated by the position information, from an output part after a second timing when a predetermined parameter indicating a change from a state at the first timing has satisfied a predetermined condition.

Hereinabove, while the mode for carrying out the present invention has been described using the embodiments, the present invention is by no means limited to these embodiments, and various modifications and replacements may be made without departing from the scope of the present invention.

For example, a part of the position information notification processing by the information management server 300 in the first embodiment is executed by the moving body (the motorcycle 100 or the user terminal device 200), and in cooperation with the moving body and the information management server 300, position information notification processing may be executed. For example, in the second timing determination method (Part 1), the position information may be transmitted to the information management server 300 when it is determined that the position information satisfies the condition 1 or the condition 2 on the side of the moving body, and the received position information may be treated as output information and output from the output part 330 on the side of the information management server 300. In the second timing determination method (Part 2), the position information may be transmitted to the information management server 300 when it is determined that the condition 1 is satisfied on the side of the moving body, whether the received position information satisfies the condition 3 may be determined on the side of the information management server 300, and the position information received when the condition 3 is not satisfied may be treated as the output information and may be output from the output part 330. Meanwhile, when the received position information satisfies the condition 3, whether the position information satisfies the condition 2 may be determined on the side of the information management server 300, and the position information received when the condition 2 is satisfied may be treated as the output information and may be output from the output part 330.

Further, the present invention is not limited to the above embodiments, and for example, the present system is not limited to motorcycles but can be widely applied to saddle riding vehicles. The saddle riding vehicle includes all vehicles in which the driver straddles the vehicle body, not only motorcycles (including motorized bicycles and scooter type vehicles), but also three-wheeled vehicles (not only a vehicle with one front wheel and two rear wheels, but also a vehicle with two front wheels and one rear wheel) and also include a vehicle with one rear wheel) or a vehicle with four wheels. In addition, it also includes a vehicle whose prime mover is an electric motor. In addition, it may be applied to an automobile having a passenger compartment. In addition, it may be applied to various devices that require communication other than the vehicles. For example, it may be applied to devices such as storage boxes and bags with communication functions. In addition, this system is not limited to saddle riding vehicles, but can be applied to vehicles with four or more wheels, such as sedans, that can accommodate multiple people.

REFERENCE SIGNS LIST

1 Position information output system
100 Motorcycle
200 User terminal device
300 Information management server
310 Communication part
320 Input part
330 Output part
340 storage
350 Processing part
351 Data management part
352 Output information generating part
353 Output controller
354 Movement distance calculation part
355 Elapsed time calculation part
356 Movement speed estimation part
357 Provision information generating part

The invention claimed is:
1. A position information output method of causing a computer to:
acquire position information, which is information indicating a position of a moving body, indicating a posi- tion which is measured by a position measurement device mounted on the moving body at a first timing via a network from the moving body including at least one of a vehicle and a terminal device owned by an occupant of the vehicle; and output the position information, which is measured at the first timing without performing calculation using the position information, from an output part after a second timing when a predetermined parameter indicating a change from a state at the first timing has satisfied a predetermined condition, wherein the computer acquires a movement speed of the moving body on the basis of information detected by a detector mounted on the moving body or the position information, in a case the movement speed is smaller than a predetermined value, sets the predetermined parameter as a distance and determines that the predetermined condition is satisfied when a movement distance from a position of the vehicle at the first timing is equal to or greater than the predetermined value, and in a case the movement speed is greater than the predetermined value, sets the predetermined parameter as a time and determines that the predetermined condition is satisfied when an elapsed time from a time in which the vehicle was at the first timing is equal to or greater than the predetermined value.

2. The position information output method according to claim 1, wherein the computer acquires an average value in a predetermined section as the movement speed of the moving body.

3. A position information output system comprising a moving body including at least one of a vehicle and a terminal device owned by an occupant of the vehicle, and an information management server configured to communicate with the moving body via a network, wherein the moving body includes a communication part configured to transmit position information, which is information indicating a position of the moving body, indicating a position which is measured by a position measurement device mounted on the moving body at a first timing to the information management server via the network, and the information management server includes an output controller configured to output information, which indicates that the moving body is present at a position indicated by the position information, from an output part after a second timing which is when a predetermined parameter indicating a change from a state at the first timing has satisfied a predetermined condition, wherein the information management server acquires a movement speed of the moving body on the basis of information detected by a detector mounted on the moving body or the position information, in a case the movement speed is smaller than a predetermined value, sets the predetermined parameter as a distance and determines that the predetermined condition is satisfied when a movement distance from a position of the vehicle at the first timing is equal to or greater than the predetermined value, and in a case the movement speed is greater than the predetermined value, sets the predetermined parameter as a time and determines that the predetermined condition is satisfied when an elapsed time from a time in which the vehicle was at the first timing is equal to or greater than the predetermined value.

4. A non-transitory computer-readable storage medium comprising a program that causes a computer to:

acquire position information, which is information indicating a position of a moving body, indicating a position which is measured by a position measurement device mounted on the moving body at a first timing via a network from the moving body including at least one of a vehicle and a terminal device owned by an occupant of the vehicle; and output the position information, which is measured at the first timing without performing calculation using the position information, from an output part after a second timing when a predetermined parameter indicating a change from a state at the first timing has satisfied a predetermined condition, wherein the computer acquires a movement speed of the moving body on the basis of information detected by a detector mounted on the moving body or the position information, in a case the movement speed is smaller than a predetermined value, sets the predetermined parameter as a distance and determines that the predetermined condition is satisfied when a movement distance from a position of the vehicle at the first timing is equal to or greater than the predetermined value, and in a case the movement speed is greater than the predetermined value, sets the predetermined parameter as a time and determines that the predetermined condition is satisfied when an elapsed time from a time in which the vehicle was at the first timing is equal to or greater than the predetermined value.

* * * * *